United States Patent [19]
Foos

[11] Patent Number: 5,137,316
[45] Date of Patent: Aug. 11, 1992

[54] STACKABLE PLASTIC SCOOP

[75] Inventor: Douglas E. Foos, Barrington, Ill.

[73] Assignee: Plastofilm Industries, Inc., Wheaton, Ill.

[21] Appl. No.: 680,842

[22] Filed: Apr. 5, 1991

[51] Int. Cl.⁵ .................................. B65D 21/02
[52] U.S. Cl. .................................. 294/55; 206/520; 73/426; D10/46.2
[58] Field of Search .................. 294/55; 73/426, 427, 73/428, 429; 206/505, 506, 515, 519, 520; 30/324, 328; D7/691; D10/46.2

[56] References Cited
U.S. PATENT DOCUMENTS

| | | | |
|---|---|---|---|
| D. 321,305 | 11/1991 | Underwood et al. | D10/46.2 X |
| 1,868,426 | 7/1932 | Momberger | 30/328 |
| 3,381,849 | 5/1968 | Karlsson | 206/520 |
| 3,441,173 | 4/1969 | Edwards | 206/520 |
| 3,526,138 | 9/1970 | Swett et al. | D10/46.2 X |
| 4,373,634 | 2/1983 | Edwards | 206/520 |

Primary Examiner—Margaret A. Focarino
Assistant Examiner—Joseph D. Pape
Attorney, Agent, or Firm—Lee, Mann, Smith, McWilliams, Sweeney & Ohlson

[57] ABSTRACT

A plastic stackable measuring scoop of the type which is frequently included in packages of granular detergents wherein a generally rectilinear scoop bowl has a front wall which slopes inwardly from top to bottom and a rear wall the central portion of which also slopes inwardly from top to bottom and has a corrugation providing a median ridge terminating just above the bottom of the bowl as an inwardly projecting shoulder which serves as a stop to limit the extent of entry of a scoop bowl thereinto. The front wall of the shoulder has a five degree backdraft to increase the distance that the shoulder extends inwardly. The slope of the central portion of the back wall of the bowl is substantially greater than the draft of the side portions thereof.

5 Claims, 1 Drawing Sheet

STACKABLE PLASTIC SCOOP

BACKGROUND AND SUMMARY OF THE INVENTION

The invention relates to scoops for transferring liquids or particulate material from one container to another. Usually the scoop is also designed to measure the material as it is taken from a container. The type of scoop with which this invention is concerned is the spoon-like utensil having a bowl and a handle extending laterally from the top of the bowl. The scoop is preferably made of plastic material, but may also be made of metal. It may be marketed as such or may be supplied with the package of material that it is intended to handle.

As an example of a particular use of the scoop of the invention, lightweight and inexpensive scoops are frequently included in packages of powdered or granular detergents such as those used for washing clothes or dishes. Such scoops must be strong enough to withstand the stresses imposed while scooping up a load of the material from the supply container. The scoops are also usually intended and designed to serve as a measuring device so that the desired amount of material is taken for transfer to the point of use.

Since scoops of the type described are supplied without separate charge with the material contained in packages for sale to consumers, they must be inexpensive as well as strong. The invention contemplates scoops that are thermoformed from suitable plastic film material. For a shipment of the thermoformed scoops by the manufacturer and, equally important, for feeding the scoops in the material packaging machine, an indispensable requirement is that they must be stackable. Stackability requires not only that the bowls of the scoops may be telescoped with minimum space for each within the stack but also that individual spoons may be easily withdrawn from the tops of stacks without sticking problems. Stop means formed in the structures of the scoops must permit maximum entry into the next lower scoops with certainty of position and the ability to retain all of the scoops in the stacks without relative movement resulting from any inward axial forces that may be applied in the course of packaging for shipment or handling the stacks as in packaging machines.

The object of the invention, accordingly, is to provide stackable plastic measuring scoops having the desirable and essential features above described. More specifically, the principal object of the invention is to provide thermoformed plastic scoops of the character described which are stiff and strong and efficiently and reliably stackable and feedable to meet all of the requirements of stackability. The scoops may also be useable for measuring a predetermined amount of material.

DESCRIPTION OF MODE BEST EMBODYING THE INVENTION

Figure 1:
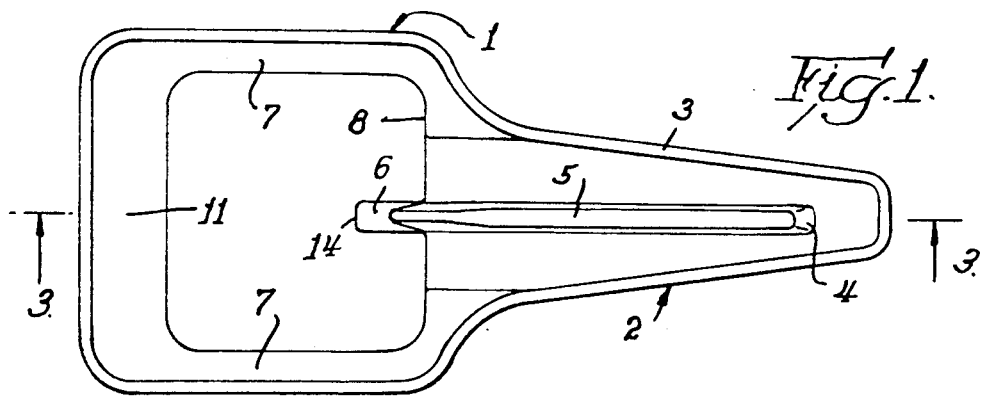
FIG. 1 is a top view of the stackable plastic scoop of the invention showing the open-topped bowl and the handle of the scoop.
Figure 2:
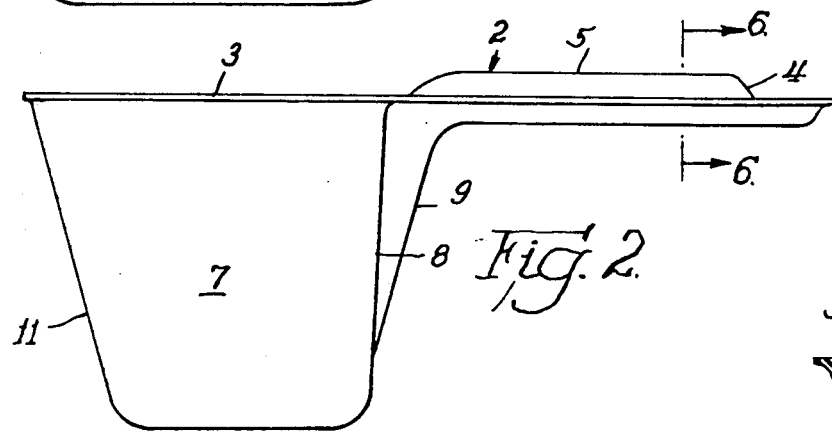
FIG. 2 is a side elevational view of the scoop of FIG. 1.
Figure 6:
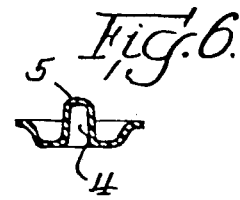
FIG. 6 is a cross-sectional view taken at the line 6—6 of FIG. 2.
Figure 3:
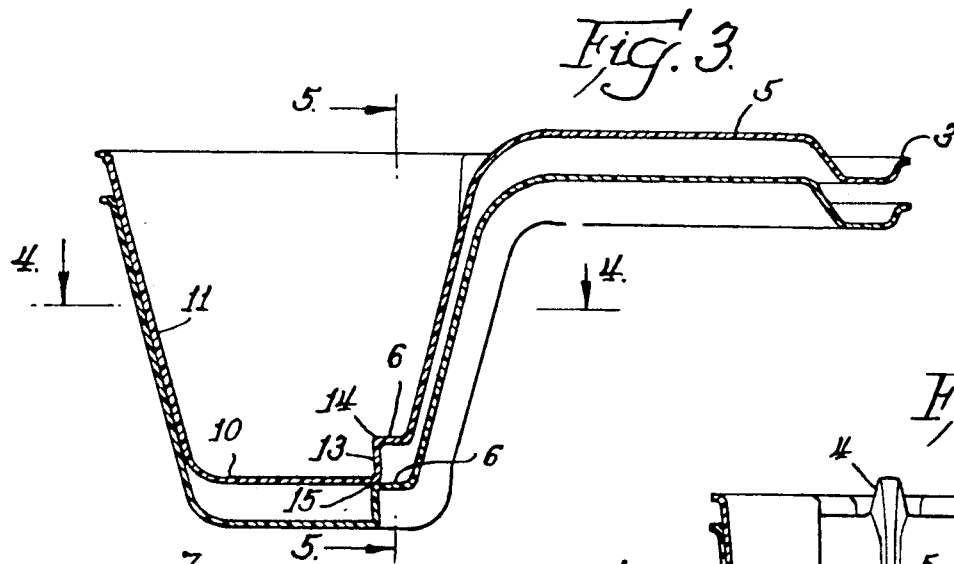
FIG. 3 is a cross-sectional view taken at the line 3—3 of FIG. 1 and showing two scoops stacked together.
Figure 5:
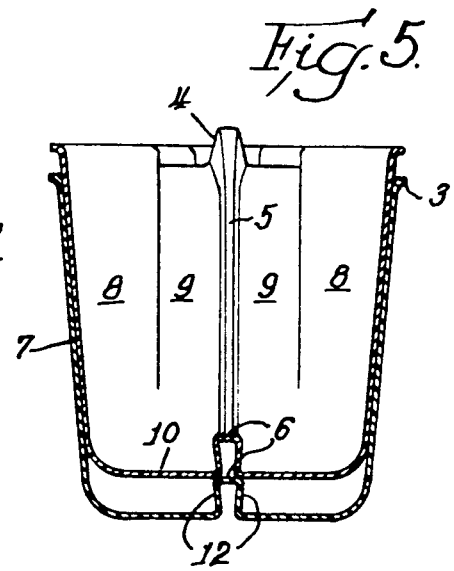
FIG. 5 is a cross-sectional view taken at the line 5—5 of FIG. 3.

The scoop herein shown and described as an example of the highest and best form of the invention is thermoformed from suitable plastic film material, for example, 0.040 polyvinyl chloride. The bowl 1 and handle 2 form the unitary product. To provide the necessary stiffness, peripheral flange 3 is provided and the handle is formed with a deep corrugation 4 which extends substantially throughout the length of the handle with the ridge 5 of the corrugation extending downwardly along the rear side of bowl 1 and ending with a shoulder 6 near the bottom of the bowl (see FIGS. 3 and 5). As will be seen from the detailed description that follows, shoulder 6 provides the stop for the entry of the next above scoop in a stack of scoops as is shown in FIG. 3.

Figure 4:
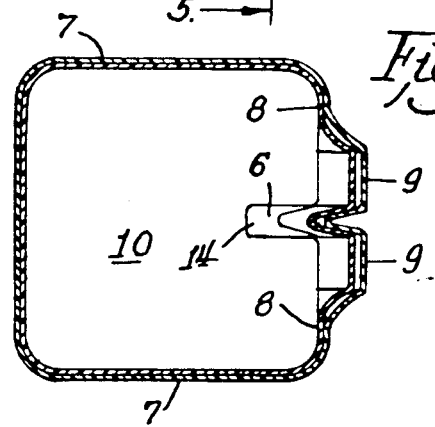
FIG. 4 is a cross-sectional view taken at the line 4—4 of FIG. 3.

The bowl 1 of the scoop is generally rectilinear. As is best seen in FIG. 4, side walls 7 are flat and are formed with the customary draft of three degrees for thermoforming. The same is true of outer portions 8 of the rear wall. The central area 9 of the rear wall slopes downwardly at an optimum angle of approximately seventeen degrees. The degree of slope is not critical and its magnitude may take into consideration the strength of the scoop and general appearance as well as the function of the slope in stacking as hereinafter described.

The front wall 11 of bowl 1 slopes inwardly from the top to the bottom of the bowl. As will be seen, this slope is important to the desired stacking features of the invention. While the angle of slope of the front wall is not critical and consideration of such factors as ease of scooping up material from a supply and pleasing appearance of the scoop, in addition to the function of the scope hereinafter described, are determinative of this dimension. An angle of about fifteen degrees to the vertical may be regarded as optimum.

Particular attention is drawn to the structure of shoulders 6 which serves as the stops for stacked scoops. The shoulder has side walls 12 (FIG. 5) and a front wall 13 (FIG. 3) extending from bottom 10 of the scoop to the platform at the top of the shoulder. Instead of the usual three degree draft, front wall 13 is formed with a backdraft of five degrees. The backdraft has the effect of extending shoulder 6 inwardly as compared with the configuration were wall 13 to be formed with the customary draft of three degrees. The important significance of this extension resides in that the top of the inner marginal portion 14 of shoulder 6 solidly engages the outer marginal portion 15 of bottom 10 of the next higher scoop in a stack. The areas of engagement of adjoining scoops in a stack is shown in FIG. 3. Cooperating with these engaging surfaces of shoulder 6 with the rear marginal portion of bottom 10 of the next higher scoop in a stack, the sloping configuration of the front walls 11 of the bowls provide guidance in stacking and insure reliable engagement of the bottom of a scoop with shoulder stop 6 of the next lower scoop in the stack.

The configurations of the scoop bowls are such that when stacked together, there is essentially no space between side walls 7 and portions 8 of the rear walls of respective adjoining scoops while there is space between the central portion 9 of the rear wall and that of adjoining scoops, all as is best shown in FIG. 4. With these configurations, there is only limited contact between the surfaces of corrugations 4 of adjoining scoops in a stack so that there is no appreciable consequential friction that might hamper intentional disengagement of scoops from a stack.

ACHIEVEMENT

By very simple means, the invention provides a thermoformed plastic scoop having efficient stackability in that the scoops may be easily and rapidly stacked, securely hold themselves in position in stacks and may be easily and rapidly withdrawn without sticking problems. The sloping front wall directs each entering scoop into stop engagement with the scoop already set into the stack and maintains this engagement pending withdrawal from the stack. The sloping portion of the rear wall of the bowl and the corrugation therein assist in the positioning of the scoop as it is inserted into a stack. The stop is positive and dependable in maintaining the spacing of the scoops in the stack pending withdrawal. The inexpensive thermoformed plastic scoop is quite stiff and strong and may be designed and used as a measure, if desired.

With inherent increase in cost, the scoop may be made of metal. Also, the invention may be adapted to the production of simple cups by merely eliminating the handle with obvious adaptive changes in design.

I claim:

1. A thermoformed stackable plastic scoop comprising a generally rectilinear bowl and a handle extending laterally from the top of said bowl; said bowl having two side walls, a front wall, a rear wall and a bottom; said front wall sloping inwardly from the top to the bottom thereof; said rear wall having a central portion sloping inwardly from the top toward the bottom of said bowl; said central portion of said rear wall having a corrugation therein forming a medial ridge interiorly of said bowl, said ridge turning inwardly near said bottom of said bowl to form a shoulder; said shoulder having a generally horizontal top, two side walls and a front wall; said front wall of said shoulder having a backdraft of approximately five degrees, said shoulder serving as a stop to limit the extent of entry of a next above scoop in a stack of said scoops.

2. A stackable scoop in accordance with claim 1 wherein the slope of said front wall of said bowl is fifteen degrees from the vertical.

3. A stackable scoop in accordance with claims 1 wherein the slope of said central portion of said rear wall of said bowl is seventeen degrees.

4. A stackable scoop in accordance with claim 1 wherein the side portions of said rear wall on each side of said central portion have normal thermoforming draft of three degrees.

5. A stackable scoop in accordance with claim 1 wherein said corrugation in said central portion of said rear wall extends continuously from said stop near the bottom of said bowl into and substantially throughout the length of said handle.

* * * * *